Aug. 4, 1959 J. W. ANDERSON 2,897,530
WINDSHIELD WIPER BLADE AND PRESSURE DEVICE THEREFOR
Filed April 14, 1955
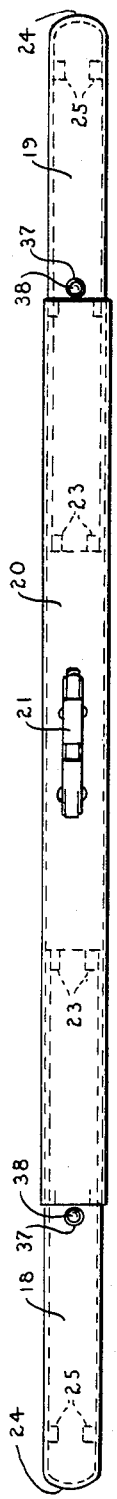
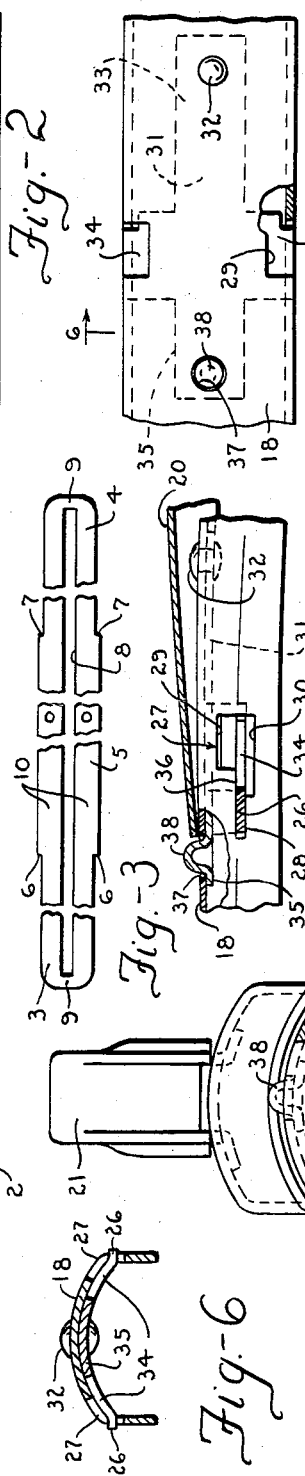
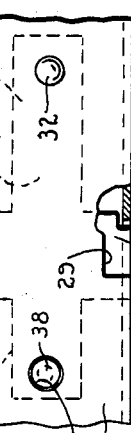
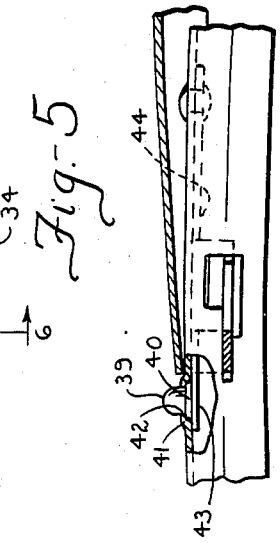
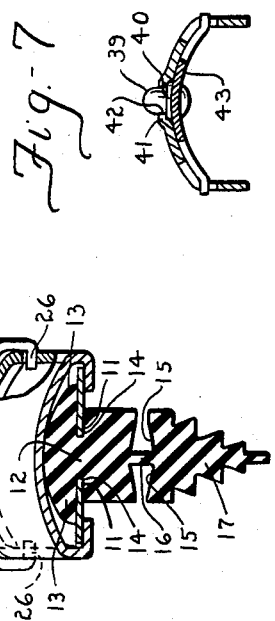
INVENTOR.
JOHN W. ANDERSON
BY
Charles N. Penfold
ATTORNEY

United States Patent Office 2,897,530
Patented Aug. 4, 1959

2,897,530
WINDSHIELD WIPER BLADE AND PRESSURE DEVICE THEREFOR

John W. Anderson, Gary, Ind.

Application April 14, 1955, Serial No. 501,233

11 Claims. (Cl. 15—245)

This invention relates generally to windshield wipers and more particularly to a wiper which will wipe a curved or flat windshield.

The wiper may be constructed in various ways, but as herein shown comprises a blade assembly and a pressure-distributing device operatively connected to the blade assembly. The blade assembly includes a resilient wiping element and a resiliently flexible support detachably connected to the element, and the pressure device preferably includes a pair of secondary yokes having their ends connected to the blade at longitudinally spaced points, a primary yoke or bridge having its ends connected to intermediate portions of the secondary yokes, and a connector carried by the primary yoke for attachment with a wiper arm.

More particularly, the support of the blade assembly is formed with reduced corresponding extremities to which the secondary yokes are respectively connected. In other words, the support is of a lesser width or narrower at its extremities than along its central area. A secondary yoke slidably receives each of these extremities for applying pressure thereto, and due to this variation in width shoulders are formed on the support to provide abutments or stops which are engageable with the inner ends of the secondary yokes for predetermining the extent of the relative sliding movement between the pressure device and blade assembly.

An important object of the invention is to provide a wiper in which the secondary yokes are preferably first slid onto the reduced extremities of the support, after which the ends of the primary yoke are connected to the secondary yokes.

A significant object of the invention is to provide improved snap-connection means for detachably connecting the primary yoke to the secondary yokes, more specifically in this respect, provision is made whereby to facilitate or expedite manual operation of the connection means to disconnect the yokes.

Other objects and advantages of the invention will become apparent after the description hereinafter set forth is considered in conjunction with the drawings annexed hereto.

In the drawings:

Figure 1 is a top view of a windshield wiper showing one form of a means employed to facilitate manual operation of the connection means;

Figure 2 is a side view of the wiper shown in Figure 1;

Figure 3 is a top view of the support or backing for the resilient wiper element;

Figure 4 is an enlarged transverse sectional view taken through the wiper to exemplify details of its construction;

Figure 5 is an enlarged partial top view of a secondary yoke showing one of a pair of locking elements utilized to detachably connect the ends of the primary yoke with the secondary yokes;

Figure 6 is a transverse section taken substantially on the line 6—6 of Figure 5 showing certain details of construction;

Figure 7 is an elevational view of the structure shown in Figure 5 with portions in section to show an end portion of the primary yoke connected to a secondary yoke;

Figure 8 is a view similar to Figure 7 showing a connection means between the primary yoke and a secondary yoke provided with a different form of means whereby to facilitate operation of the connection means; and Figure 9 is a transverse section taken through an appropriate part of the structure illustrated in Figure 8 to exemplify details of construction.

As exemplified in the drawings, the blade assembly includes a resiliently flexible support 1 and a resilient wiper element 2. The support is elongated and of uniform thickness with corresponding reduced end extremities 3 and 4 and an intermediate portion 5 of a greater width than the extremities. This variation in width forms shoulders which provide longitudinally spaced abutment means 6 and 7. The support is preferably provided with an elongated narrow slot 8 terminating short of the ends of the support to provide connecting or hinge portions 9 whereby longitudinal parallel portions 10 of the support can be spread apart to enlarge the size of the slot so that the resilient element 2 can properly be located therein, after which the longitudinal portions 10 are released to cause such portions to interlock with the element. As further shown in Figure 3, each of the longitudinal portions is provided with an aperture for receiving a tool to assist in spreading the portions apart.

The resilient element 2 is preferably formed in one piece with opposed longitudinally extending exterior grooves 11 therein to provide a neck 12. The grooves 11 receive the inner marginal edge portions of the longitudinal portions 10 with the neck 12 between such portions so that upper portions 13 and lower portions 14 of the element engage the upper and lower surfaces of the support as depicted in Figure 4. The element is further formed with a second pair of opposed longitudinally extending exterior grooves 15 to provide a hinge 16 to permit a controlled pivotal movement of a wiping head 17 having wiping edges thereon as shown.

As set forth above, the pressure-distributing device preferably includes a pair of corresponding secondary yokes 18 and 19 having their ends detachably connected to the support, a primary yoke 20 having its ends detachably connected to intermediate portions of the secondary yokes, and a connector 21 carried by the primary yoke for detachable connection with a wiper arm.

The secondary yokes 18 and 19 are preferably identical in design and construction. The inner end of the base wall of each secondary yoke is formed to provide a transverse arcuate or curved edge 22 for rockably engaging the upper part of the wiper element. The inner end of each of these yokes is provided with a pair of corresponding ears 23. The outer end of each secondary yoke is provided with a shroudlike end wall 24 which serves to conceal the ends of the support. The outer end of each of the secondary yokes is also provided with a pair of ears 25 spaced inwardly from its end wall 24. As clearly shown in Figure 4, the outer end portion of the base wall of each of the secondary yokes may rockably bear against the upper or overlying portions 13 of the wiper element in a manner similar to the curved edges 22. The pairs of ears 23 and 25 of the yoke 18 extend under the reduced extremity 3 of the support and the corresponding ears of the yoke 19 similarly extend under the extremity 4 of the support to effect a sliding fit between these yokes and the support. The secondary yokes are preferably assembled with the support by merely sliding the yokes inwardly along the extremities of the support until the inner ends of the yokes engage the abutment means 6 and 7 after which the primary yoke is attached to the secondary yokes in a manner which will be subsequently described.

As pointed out above, one of the objects of the invention is to provide improved means for detachably connecting the ends of the primary yoke to the secondary yokes. The means for this purpose includes providing each end of the primary yoke with a pair of inturned corresponding fingers 26, and the intermediate portion of each secondary yoke with a pair of openings generally designated 27 which lead to slots 28. More particularly in this regard, each opening includes a part 29 which initially receives one of the fingers, and a part 30 of a greater length than the part 29. Resilient means preferably in the form of a generally T-shaped spring 31 constituting a locking element is secured substantially within the confines of each secondary yoke by a rivet 32 or equivalent means. Each spring includes a leg 33 through which the rivet extends and a pair of corresponding arms 34 and a leg 35 which is somewhat shorter, but coextensive with the leg 33. The springs are of a size and length and so connected to the yokes that they are readily yieldable and positive in action. The arms 34 are located in the parts 30 of the openings and normally yieldably bear upwardly against a shoulder 36 to close the slots 28. The parts 30 of the openings serve the dual purpose of providing clearance for the operation of the arms of the spring and as a passageway to permit entry of the fingers 26 on the primary yoke into the slots 28. Attention is directed to the fact that the ends of the arms which extend into the parts 30 of the openings are offset and preferably notched to cooperate with marginal edges of the parts 30 as to alleviate side play of the spring.

To connect an end of the primary yoke with a secondary yoke it is merely necessary to position the fingers 26 in the openings until they bear against the arms 34 of the spring; force is applied to depress the arms into the large parts 30 of the openings to clear the slots after which the fingers are inserted into the slots 28. The moment the fingers become seated in the slots, the spring is released so that it snaps back to its normal locking position with the arms bearing against the shoulders 36 to locate the arms in the plane of the fingers, and thereby lock the fingers in a way that lateral rocking movement of the secondary yoke with respect to an end of the primary yoke is controlled to assist in obtaining proper movement of the blade assembly to promote a good wiping action.

The means for effecting a quick disconnection of the primary yoke with either or both of the secondary yokes is simple in construction, but positive in operation and will now be described. As clearly shown in Figures 5 and 7 of the drawing, each of the secondary yokes opposite the short end 35 of a spring is provided with an aperture 37 and each of the ends 35 of the spring is provided with a button 38 integral with the spring. The buttons constitute manual actuating means and they extend outwardly through the apertures for convenient manipulation to depress the spring to permit release of the fingers 26 of the secondary yokes from the primary yoke as explained above. It will be noted that the size and shape of the buttons and their relationship to the ends of the primary yoke are such that there is practically no opportunity for them to be accidentally displaced; nor do they afford obstructions on which a cleaning cloth can be caught.

The modified form of manual release shown in Figures 8 and 9 is different from the one above described by utilizing buttons which are not integral with the springs. More specifically, each button preferably includes a dome portion 39 and an annular flange portion 40. Each of the secondary yokes is provided with a recessed portion 41 which in turn is provided with an aperture 42. The dome extends through the aperture, and the flange is seated and held in the recessed portion by the end 43 of a spring 44. Pressing the buttons inwardly will obviously effect a release of the primary yoke from the secondary yokes in the same manner as described above.

The detachable connections above described are simple to operate, but positive and efficient and offer advantages with respect to removing a worn or damaged blade assembly from the pressure device and replacing it with a new blade assembly.

Other forms of detachable connections between pressure members of a pressure device are respectively disclosed in my copending application Serial No. 609,631, filed September 13, 1956.

Attention is directed to the fact that the fingers on the primary yoke are preferably interconnected with the slots in the secondary yokes after the latter are assembled on the support as stated above, but if found desirable one of the secondary yokes can be first connected with either end of the primary yoke, after which the secondary yokes are assembled with the support so that the other end of the primary yoke can be snapped into connection with the other secondary yoke. The arrangement thus affords more than one way of assembling the yokes with respect to one another and the support.

When the pressure device and blade assembly are operatively connected together as illustrated in Figures 1 and 2, the wiping edges of the wiper element may be caused to conform either to a curved or flat surface or combinations of such surfaces. Attention is also directed to the fact that the secondary yokes are formed so that portions thereof straddle the reduced extremities of the support and serve to substantially conceal the outer longitudinal edge portions of the support and prevent entry of foreign matter between these yokes and the support. The end hinge portions 9 of the support are concealed by the shrouded end walls of the secondary yokes. It is further apparent that the overlapping portions 13 of the wiping element under the secondary yokes are also substantially concealed.

In order to reduce noise or vibration between the pressure device and blade assembly, the relationship between portions of the ends of the secondary yokes, the support and wiper element is such that the transverse curved marginal edges 22 provided on the inner ends of the secondary yokes will normally engage the upper surface of the upper part or overlapping portions 13 of the wiper element. Portions of the outer ends of the secondary yokes spaced from the end walls 24 also serve to engage the upper part of the element as shown in Figure 4. This bearing relationship between the element and secondary yokes provides a cushion for the parts and also assists in controlling relative lateral movement between these yokes and the blade assembly. Vibration is also reduced by limiting the extent of relative longitudinal movement between the blade assembly and pressure device. In other words, the distance between the inner ends of the secondary yokes and the abutment means 6 and 7 is predetermined so that just sufficient play is permitted to produce the desired working movement between the parts. Vibration or noise is further reduced by the relatively close fits established between the fingers on the primary yoke and the pairs of openings in the intermediate portions of the secondary yokes.

Having thus described my invention, it is obvious that various modifications may be made in the same without departing from the spirit of the invention, and, therefore, I do not wish to be understood as limiting myself to the exact forms, constructions, arrangements and combinations of parts herein shown and described.

I claim:

1. A windshield wiper comprising: a blade assembly having a resilient wiping element and a resiliently flexible support therefor having reduced end extremities forming with an intermediate portion thereof a pair of abutment means, a pressure-distributing device having a pair of secondary yokes with the ends of the yokes respectively mounted on said end extremities with the inner ends of the secondary yokes located on opposite sides of the abutments, connections connecting the ends of the primary yoke with the secondary yokes, the connections between the primary yoke and secondary yokes being detachable while the secondary yokes are mounted on the support, and means extending from the connections and located externally of the device for facilitating the operation of the connections.

2. A pressure-distributing assembly for use with a windshield wiper blade comprising a pair of pressure members and a bridge, each of said members being provided with a seat, each end of the bridge having a projection disposed on a seat, retractable resilient means carried by each of the members for automatically holding the projections on the seats after the resisilent means are retracted by the projections, and means apart from said bridge and extending externally from the pressure members for actuating the resilient means to effect a release of the projections from the seats.

3. A pressure-distributing assembly for use with a resiliently flexible windshield wiper blade, said assembly comprising a pair of pressure members provided with means for connection with the blade at longitudinally spaced locations, one of said members being provided with a seat and the other with a projection disposed on the seat, a retractable spring for automatically holding the members together after the spring is retracted by the projection, and means apart from said other member and extending outwardly from said one member for actuating the spring so that the projection can be disengaged from the seat to permit disconnection of the members.

4. A pressure-distributing assembly for use wtih a resiliently flexible windshield wiper blade, said assembly comprising a pair of pressure members provided with means for connection with the blade at longitudinally spaced locations, one of said members being provided with a seat and an opening leading thereto and the other member having a projection received on the seat through the opening, an elongated leaf spring connected to said one member at a location spaced from said opening and having a movable portion engageable with the projection for automatically holding the projection on the seat when placed thereon, and means extending from the spring and externally of said one member for operating said portion in order that the projection can be disengaged from the seat and thereby permit separation of the members.

5. A windshield wiper comprising: a blade assembly having a resilient wiping element and a resiliently flexible support therefor having reduced end extremities forming with an intermediate portion thereof a pair of abutment means, a pressure-distributing device having a pair of secondary yokes with the ends of the yokes respectively mounted on said end extremities with the inner ends of the secondary yokes located on opposite sides of the abutments, connections connecting the ends of the primary yoke with the secondary yokes, and means extending from the connections and located for manual operation externally of the device for facilitating their operation.

6. A pressure-distributing assembly for use with a windshield wiper blade comprising a pair of pressure members and a bridge, each of said members being provided with a seat, each end of the bridge having a projection disposed on a seat, locking means carried by each of the members for automatically locking the projections on the seats when placed thereon, and individual means respectively located beyond the ends of the bridge for selectively operating the locking means.

7. A pressure-distributing assembly comprising a pair of elongated pressure members having ends adapted to be operatively attached to a windshield wiper blade, means affording a connection between said members, means for automatically locking said connection when the members are brought together, and means movable substantially transverse to the longitudinal axes of said members for manipulating the locking means to permit release of said members.

8. In combination: a windshield wiper blade assembly and a pressure-distributing device, said device comprising a plurality of elongated members operatively attached to the blade assembly at longitudinally spaced locations, means on the device for attachment to a wiper arm, means on said members affording a connection therebetween, means for locking the connection, and means movable substantially transverse with respect to the longitudinal axes of the members for manipulating the locking means to permit release of said members.

9. A pressure device for connection with a windshield wiper blade, said device comprising a pair of elongated members and a connector for attaching the device to a wiper arm, one of said members being provided with a seat and a retractable locking element remote from the connector, the other of said members having an extremity overlapping said one member and provided with a projection held on the seat by the element, said element being retractable by the projection when the latter is introduced to the seat, and means extending from the element and externally of said one member for actuating the element to effect separation of the members.

10. In combination: a first channel member having side portions provided with slotlike seats and openings leading to the seats, abutments on the member, an elongated spring having one extremity anchored in the channel and its other extremity being movable, said other extremity having a pair of offsets which are respectively disposed in the openings and bear against the abutments to normally block entry of projections on a second channel member into the seats, a second channel member of a size to at least partially receive the first channel member, said second channel member having inturned projections adjacent its side portions for introduction into the seats through the openings, the arrangement being such that when the projections are inserted to predetermined distances into the openings the offsets of the spring will be moved off the abutments and thereby permit insertion of the inturned projections into the seats whereupon the spring will automatically cause the offsets to re-engage the abutments to lock the projections in the seats, and means extending from the spring for manual operation to actuate the spring to effect release of the projections from the seats when desired.

11. In combination: a first member having offset portions provided with slotlike seats and openings leading to the seats, abutments on the member, a spring having a portion anchored to the member and another portion which is movable, said movable portion having a pair of lateral portions which are respectively disposed in the openings and bear against the abutments to normally block entry of projections on a second member onto the seats, a second member for straddling at least a portion of the first member and having projections for introduction into the seats through the openings, the arrangement being such that when the projections are inserted to predetermined distances into the openings the lateral portions of the spring will be moved off the abutments and thereby permit insertion of the projections onto the seats whereupon the spring will automatically cause the lateral portions to re-engage the abutments to lock the projections on the seats, and means jointly held by the first member and spring for actuating the spring to effect release of the projections when desired.

References Cited in the file of this patent

UNITED STATES PATENTS

| Number | Name | Date |
| --- | --- | --- |
| 369,067 | Macmillan | Aug. 30, 1887 |
| 2,432,689 | Smulski | Dec. 16, 1947 |
| 2,667,656 | Oishei | Feb. 2, 1954 |
| 2,709,825 | Nesson | June 7, 1955 |
| 2,713,695 | Oishei | July 26, 1955 |
| 2,782,445 | Krohm | Feb. 26, 1957 |

FOREIGN PATENTS

| Number | Country | Date |
| --- | --- | --- |
| 670,333 | Great Britain | Apr. 16, 1952 |